March 18, 1958 J. KRITZ 2,826,912
ACOUSTIC VELOCITY MEASURING SYSTEM
Filed Dec. 27, 1948 2 Sheets-Sheet 1

INVENTOR.
JACK KRITZ
BY
Moses, Nolte, Crews + Berry
ATTORNEYS

INVENTOR.
JACK KRITZ

United States Patent Office

2,826,912
Patented Mar. 18, 1958

2,826,912

ACOUSTIC VELOCITY MEASURING SYSTEM

Jack Kritz, Brooklyn, N. Y.

Application December 27, 1948, Serial No. 67,503

11 Claims. (Cl. 73—194)

This invention relates generally to velocity measurement systems, or flowmeters, and has specific application to such systems including electronic means and methods for fluid measurement and control.

The present invention has as its object the provision of means for the measurement of velocity, temperature, pressure, viscosity or the specific gravity of matter in a fluid state, for example, liquids, gases, gaseous vapors, or powdered solids, in a substantially accurate and critical manner.

Fundamental in the operation of the hereinafter described invention is the determination of the variation or change in the effective velocity of propagation of sound or sonic vibration and/or waves caused by the physical state or characteristics of such fluids.

It is therefore an object of the present invention to provide electroacoustic means to determine the effective velocity of propagation of sound through fluids having varying physical characteristics.

Another object of the present invention is to provide electronic measuring apparatus adapted for use with sonic generators to determine the velocity of propagation of sound waves through a varying fluid medium.

Yet another object of the present invention is to provide novel electro-acoustical means and methods for determining the velocity of a fluid in a manner substantially independent of the physical or chemical state of said fluid.

Another object of the present invention is to provide electrical apparatus for determining the velocity of propagation of acoustic waves in a fluid independently of the velocity at which said fluid is moving.

Another object of the present invention is to provide in a novel fluid control system means for determining the change in the effective velocity of propagation of sound and which is adapted to utilize therein electro-acoustical transducing apparatus.

The invention, in another of its aspects, relates to novel features of the instrumentalities described herein for achieving the principal objects of the invention and to novel principles employed in those instrumentalities, whether or not these features and principles are used for the said principal objects.

Other objects of the invention and the nature thereof will become apparent from the following description considered in connection with the accompanying drawings and the scope of the invention is determined from the appended claims.

In the drawings.

In the drawings like reference characters denote components exercising similar functions.

Figure 1:
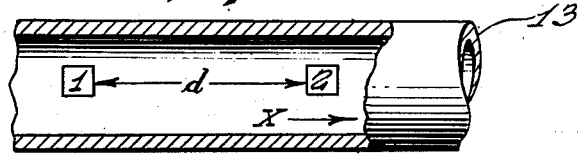
Fig. 1 is a diagrammatic representation of a positional arrangement of a plurality of transducers within a fluid confining pipe or duct and which is useful in illustrating the principle of operation of the present invention.

Referring now to Fig. 1, the principle and operation of the invention is disclosed. Consider a fluid, which may be of any desired character, moving in a pipe or duct 13 in a direction as indicated and at a velocity whose absolute value may be represented by the variable $x$. At 1 and 2, therein, a spaced pair of electro-mechanical devices usually referred to as transducers for converting electrical vibrations to acoustic vibrations and, in a reverse manner, from acoustic to electrical vibrations, are placed.

If now transducer 1 is electrically excited at a frequency $f_1$ by an oscillator of adjustable frequency 3, and the resultant excitation is received by transducer 2, and this excitation compared, by means of a phase detector 11, with the excitation of transducer 1, then oscillator 3 may be adjusted to give $f_1$ such a value that it may be expressed by the relationship $$f_1 = \frac{v_p + x}{nd}$$

where $v_p$ is the velocity of propagation of acoustic waves in the still fluid; $x$ is the velocity of the fluid; $n$ is any arbitrary value; and $d$ is the distance between transducers. If transducer 2 is now electrically excited, by a separate adjustable oscillator 4, at a frequency $f_2$, and the received excitation at transducer 1 is compared, by means of phase detector 11, with that of 2, frequency $f_2$ may now be adjusted so that it may be expressed by the relationship $$f_2 = \frac{v_p - x}{nd}$$

As an example of the operation of comparison, for $n = 1$, $\frac{1}{2}$, $\frac{1}{3}$, etc., the frequency is adjusted so that the received signal is in electrical phase coincidence with the transmitted signal.

Standard techniques presently known to the art involving the use of apparatus such as phase detectors, oscilloscopes etc. may be used. In any event, the amount of phase shift is the same when transmitting from transducer 1 to transducer 2 as when transmitting in the opposite direction from transducer 2 to transducer 1.

If frequencies $f_1$ and $f_2$ are next subjected to heterodyning action, then accurate evaluation of either algebraic sum $f_1 - f_2$ or $f_1 + f_2$ may be obtained. Thus, $$f_1 - f_2 = \frac{2x}{nd}$$

is a value of frequency which is determined by the quantity $x$ and no other quantity dependent on fluid characteristics ($n$ and $d$ are constants) and therefore determines the velocity of the fluid independently of the physical or chemical state of the fluid.

$$f_1+f_2=\frac{2v_p}{nd}$$

is a value of frequency which is determined by the variable quantity $v_p$ alone and is consequently independent of the velocity at which the fluid is moving.

A number of arrangements of transducers and associated equipment to produce quantities $f_1-f_2$ and $f_1+f_2$ will now be described. In the block diagram of Fig. 2, components 1 and 2 are represented as being transducers, and 3 and 4 designate independently variable oscillators whose frequencies may be independently adjusted. Block 5 represents a mixer, heterodyne converter, or similar beat frequency device which yields as an output either the sum of two input frequencies or their difference, or both, and hereinafter referred to as a demodulator; 6a band pass filter designed to pass frequencies in the region $f_1-f_2$; and 7a band pass filter designed to pass frequencies in the region $f_1+f_2$. 8 represents a frequency meter reading $f_1-f_2$; 9, a frequency meter reading $f_1+f_2$; 10, a switching system and 11 designates a phase detector. In this embodiment variable oscillators 3 and 4 may consist of high frequency oscillators which are frequency divided down to lower frequencies and these lower frequencies applied to the transducers to provide frequency multiplication of $f_1-f_2$ and $f_1+f_2$ in the high frequency oscillators themselves, and 10 may be a manual or electronic switching system. Further, 11 may be an amplifier and oscilloscope or any of the standard amplifier-phase detector devices well known in the art.

Figure 3:
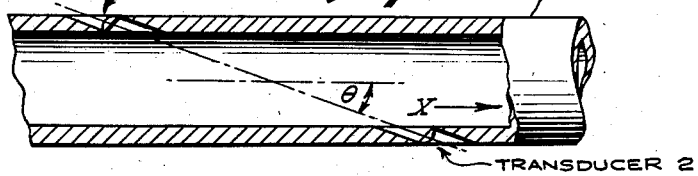
Fig. 3 is an illustration of another positional arrangement of the transducers shown in Fig. 1 but where said transducers need not be placed in the fluid stream.

Transducers 1 and 2 need not be placed in the fluid stream but may be placed at the edge of the stream in a manner as indicated in Fig. 3. In this case the velocity measured by $f_1-f_2$ will indicate the value $x \cos \theta$, but since $\theta$ is a known constant, the value of $x$ is measured accurately.

Figure 2:
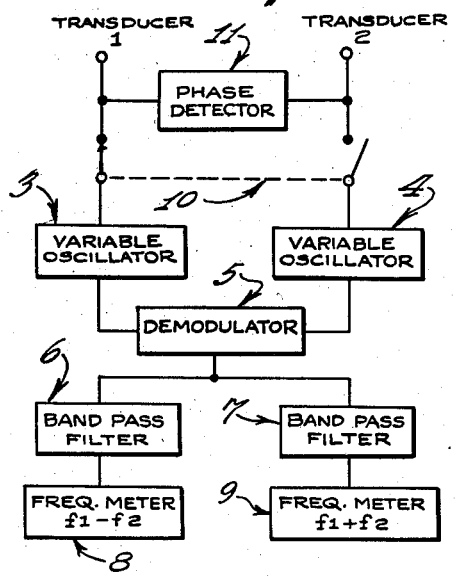
Fig. 2 is a block diagram illustration of an embodiment of the measuring, control system of the present invention as adapted to use a plurality of variable oscillators.
Figure 5:
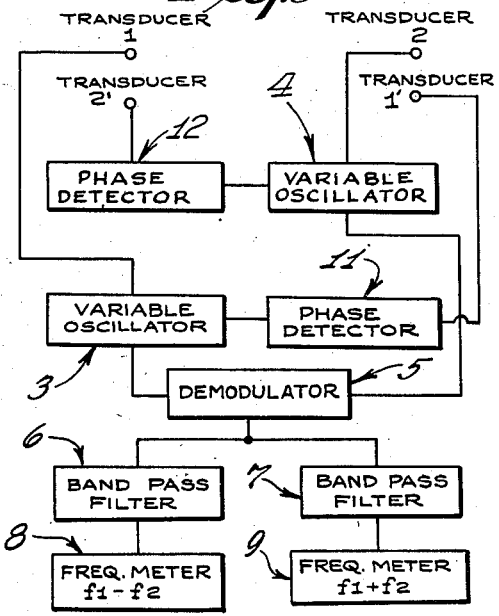
Fig. 5 is an illustrative embodiment in block form of a modification of the invention as shown in Fig. 2 and wherein the need for electronic or manual switching between the transducers is eliminated.
Figure 4:
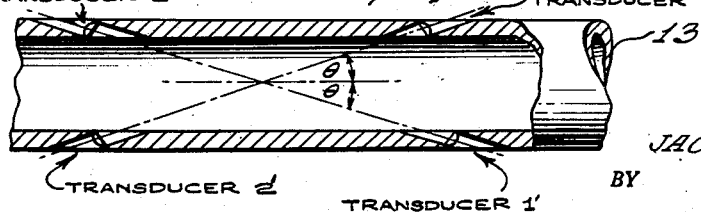
Fig. 4 is an illustration of a positional arrangement of a plurality of transducers wherein the need for electronic or manual switching between the transducers is eliminated.

In Fig. 4 there is shown a method of operation without the necessity of electronic or manual switching. Transducers 1, 1', 2, 2' are operated at such frequencies and are designed with such directive acoustic properties as to propagate the sound vibrations in a highly directional manner from 1 to 1' and 2 to 2'. Phase detection can then be applied from 1 to 1' and 2 to 2' in a manner as shown in Fig. 5 where similar reference characters pertain to similar counterparts of Fig. 2 and 11 and 12 are phase detectors.

In all these modes of operation, it is considered that little acoustic energy is transmitted to the pipe wall. This may be accomplished by the proper techniques of acoustic insulation between the transducers and the pipe wall. For conditions where pipe transmission is high such as the placement of the transducers on the pipe exterior and transmitting acoustic vibrations to the fluid through the pipe wall, the following operational techniques may be applied. The electrical excitation to the transducers is of short duration and is essentially of rectangular pulses or pulsed carrier oscillations. Due to the usually large difference in the velocity of propagation between the pipe material and the fluid, the system is rendered insensitive to those pulses received by the receiving transducer which are transmitted through the pipe wall, and is active only on those pulses received by transmission through the fluid. The frequencies $f_1$ and $f_2$ in this case signify the repetition rate of the pulses.

Figure 6:
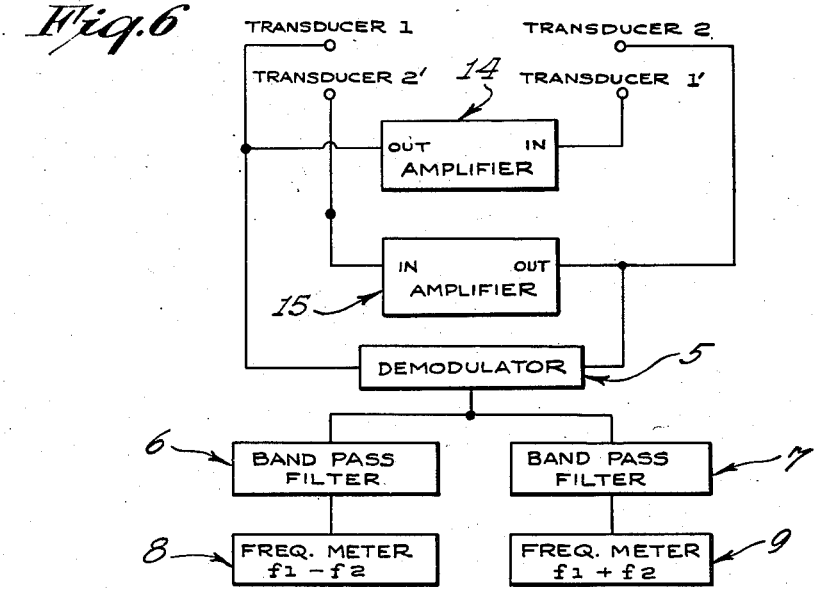
Fig. 6 is a block diagrammatic representation of a modification of the invention for accomplishing the fluid control and measurement based on a duality of self-oscillatory systems.

Another embodiment of the invention is shown in the block diagram of Fig. 6. Amplifier 14 is connected as shown including a feed-back path between transducers 1 and 1'. The gain of amplifier 14 is such that sustained oscillations will result at frequency $f_1$ at a value of $n$ determined by the band pass characteristics of the amplifier. Amplifier 15, similar in characteristics to 14 is connected as shown between transducers 2 and 2'. Oscillations will result of frequency $f_2$. Demodulator 5, band pass filters 6, 7 and frequency meters 8, 9 perform the same functions as in Fig. 2. This arrangement eliminates the need for adjustment of frequencies and is a continuous measuring device. The fluid performs the function of the frequency determining element of an oscillatory system.

Figure 7:
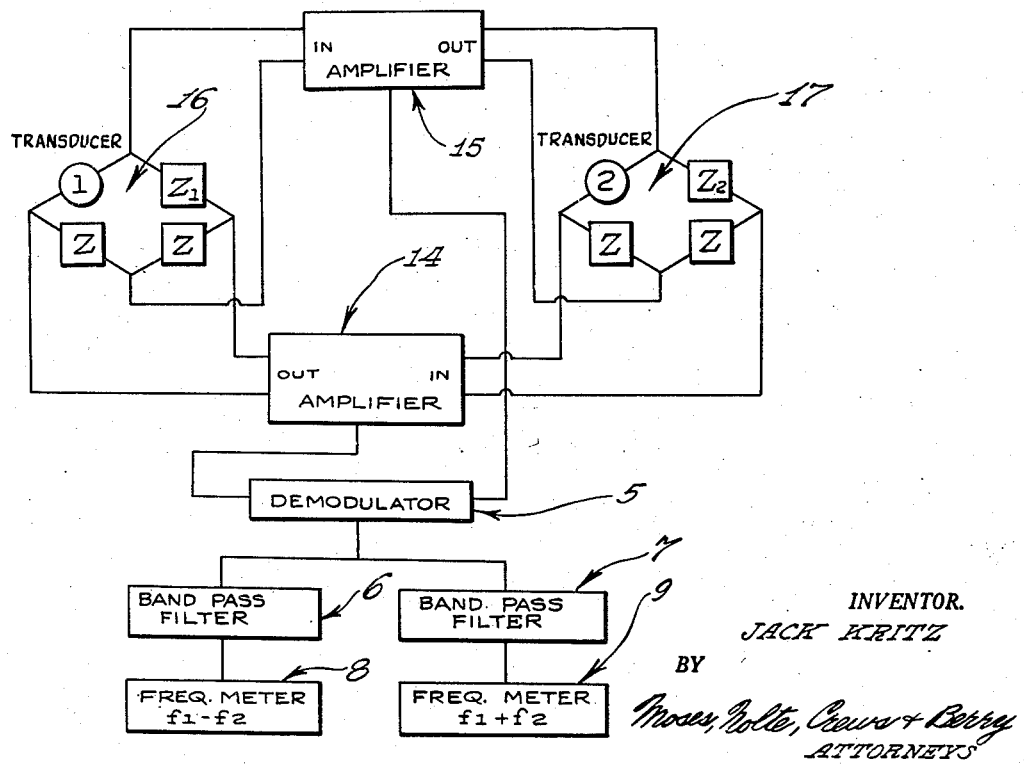
Fig. 7 is a block diagrammatic representation of a modification of the invention as adapted for use with a balanced impedance bridge device.

Fig. 7 shows a modification of the invention using only two transducers 1 and 2 positioned as indicated in Fig. 1 or Fig. 3 and thus coupled to the fluid stream, and has the additional advantage of eliminating the necessity of accurate placement of the two sets of transducers as in Fig. 4. Networks 16 and 17 are two similar balanced bridges which operate as decoupling devices and which prevent the output of one amplifier from being applied to the input of the other amplifier. $Z_1$ designates a balancing circuit element having an impedance effectively vectorially equal in all respects to the impedance of transducer 1 and actually may consist of a dummy transducer. $Z_2$ designates a balancing circuit element similar to the circuit element $Z_1$ and which has an impedance effectively vectorially equal in all respects to the impedance of transducer 2 and may actually consist of a dummy transducer. Bridges 16 and 17 are individually accurately balanced preventing feed-back around the path comprising amplifiers 14 and 15 in cascaded relationship. Amplifier 14 is coupled between transducers 1 and 2 and will oscillate at $f_1$. Amplifier 15 is similarly coupled in the opposite direction between transducers 2 and 1 and will oscillate at frequency $f_2$. Thus, amplifiers 14 and 15 constitute a bi-directional amplifying system, and therefore, if the two bridges or similar networks 16 and 17 are sufficiently well balanced, cannot cause subsidiary oscillatory effects.

It will be noted from the foregoing description that the effect of the balanced bridges 16 and 17 is to block transmission around through an undesired transmission path which includes the bridges 16 and 17 and the amplifiers 14 and 15, each in its direction of amplification, but which excludes the transducers 1 and 2. The balanced bridges 16 and 17 thus render the frequencies of sustained oscillations through each of the individual amplifiers 14 and 15 effectively independent of each other. The frequency of oscillations passing through each amplifier is effectively determined by conditions in the fluid which will differ between the two amplifiers only by reason of their opposite directions of transmission through the fluid medium. For the amplifier 14, the direction of transmission of acoustic waves through the fluid is downstream from transducer 1 to transducer 2 (Figs. 1 and 3). For amplifier 15 the direction of transmission of acoustic waves through the fluid is upstream from transducer 2 to transducer 1.

The electro-acoustical device for measuring the physical characteristics of fluids, as described above, is merely illustrative and not exhaustive, and since many changes could be made in the above construction and since many apparently widely different embodiments of the invention could be made without departing from the scope thereof, it is intended that all matter contained in the above description or shown in the accompanying drawings shall be interpreted as illustrative and not in a limiting sense.

I have described what I believe to be the best embodiments of my invention. I do not wish, however, to be confined to the embodiments shown, but what I desire to cover by Letters Patent is set forth in the appended claims.

What I claim is:

1. Apparatus for measuring the velocity of acoustic propagation in a fluid comprising: a plurality of spaced transducers acoustically coupled to said fluid for propagating oppositely directed acoustic vibrations therein; variable frequency energizing means connected with said transducers for energizing spaced ones of said transducers at two adjustably different frequencies to produce the same wavelength of acoustic vibrations in said fluid, said difference in frequencies arising from said opposite directions of transmission through said fluid; beat frequency means coupled to said energizing means for deriving therefrom a third frequency equal to the arithmetic sum of said two frequencies; means coupled to said beat frequency means for selecting said third frequency from other frequencies; and utilization means coupled to said frequency selecting means to determine the velocity of acoustic propagation in the fluid independently of any component of any flow velocity of the fluid directed along a line joining said spaced ones of said transducers.

2. Apparatus according to claim 1 wherein a pair of said transducers are diagonally opposite each other, and a second pair of said transducers are diagonally opposite each other and in juxtaposition to said first-named transducers; and said variable frequency energizing means include a pair of amplifiers interconnecting said transducers in pairs for opposing directions of acoustic transmission between the transducers of each pair and providing sufficient gain to produce sustained oscillations in the fluid.

3. In a velocity measuring system in combination, a pair of spaced electroacoustic transducing means acoustically coupled to a fluid; two amplifiers; means defining a first self-oscillatory feedback path for one of said amplifiers extending through said amplifier, said transducers and through said fluid by means of acoustic waves of a predetermined length traveling in one direction; means defining a second self-oscillatory feedback path for the other amplifier extending through said other amplifier, said transducers and through said fluid by means of acoustic waves of said predetermined length traveling in the direction opposite to said one direction; combining means connected to both of said feedback path defining means for additively combining the two frequencies of self-oscillation; and frequency determining means connected for response to the combining means for determining characteristics of the fluid with respect to the propagation velocity of acoustic waves therein independently of any velocity component of any motion of the fluid directed along a line joining the transducing means.

4. In a velocity measuring system for measuring a velocity characteristic of a fluid medium, in combination: a pair of spaced transducers acoustically coupled to said fluid medium; a bi-directional amplifier system comprising a separate amplifier for each direction each amplifier operatively interconnecting both transducers, said amplifiers being oppositely connected to said transducers for causing the transmission therebetween of acoustic waves traveling in opposite directions through said fluid medium, the amplification in each direction being sufficient to cause sustained oscillations through each amplifier at a frequency determined by acoustic conditions of the fluid in the particular direction of transmission for which the amplifier is connected; blocking means included in said amplifier system and connected for effectively blocking transmission through a transmission path excluding said transducers and extending through both amplifiers in their respective directions of amplification, said blocking means rendering said frequencies of sustained oscillation through each amplifier effectively independent of each other; and combining means connected to said amplifier system for deriving therefrom the algebraic sum of said frequenices of sustained oscillation, said sum being substantially directly proportional to the absolute value of the velocity to be measured.

5. A system as in claim 4 wherein the algebraic sum of the frequencies is the arithmetic sum thereof, whereby the propagation velocity of acoustic waves in the fluid medium may be determined independently of any velocity component of any motion of the fluid medium along a line joining the spaced transducers.

6. A system as in claim 4 wherein the algebraic sum of the frequencies is the arithmetic difference therebetween, whereby the velocity component of any motion of the fluid medium along a line joining the spaced transducers may be determined independently of the velocity of propagation of acoustic waves therein.

7. A system as in claim 4 further comprising a duct adapted to receive the fluid medium, the transducers being spaced axially with respect to the duct.

8. A system as in claim 4 further comprising a duct adapted to receive the fluid medium, the transducers being spaced generally axially with respect to the duct on opposite sides thereof.

9. In a velocity measuring system, in combination: two spaced transducers each capable of simultaneously and effectively independent operation both as a transmitting and as a receiving transducer and each adapted to be acoustically coupled to the other by a fluid medium; two mutually independent and oppositely directed amplifying means each having an input and an output, the input of one of said amplifying means and the output of the other of said amplifying means being coupled to one of said transducers and the output of said one of said amplifying means and the input of said other of said amplifying means being coupled to the other of said transducers, the amount of amplification of each of said amplifying means being at least sufficient to cause sustained oscillations in a transmission loop including said amplifying means, said fluid medium, and both of said transducers; decoupling means connected in said system and associated with at least one of said transducers, said decoupling means being further connected to block transmission from the output of one of said amplifiers to the input of another of said amplifiers coupled to the same transducer whereby the frequency of sustained oscillations in each loop is caused to be effectively independent of the frequency of oscillation in the other loop; beat frequency means coupled to both loops for deriving the algebraic sum of said two frequencies of sustained oscillation; and frequency measuring means connected with said beat frequency means for determining the value of said algebraic sum.

10. The combination according to claim 9, in which an individual decoupling means is associated with each of said transducers.

11. The combination according to claim 9, wherein said decoupling means comprises an effectively balanced bridge circuit, the output of one amplifying means and the input of another amplifying means coupled to the same transducer being coupled to conjugate points of said balanced bridge circuit for blocking transmission from said output to said input, said transducer being coupled to both of said amplifying means through an arm portion of said bridge circuit.

References Cited in the file of this patent

UNITED STATES PATENTS

| | | |
|---|---|---|
| 1,495,852 | Kunze | May 27, 1924 |
| 1,858,931 | Langevin et al. | May 17, 1932 |
| 1,881,543 | Hartig et al. | Oct. 11, 1932 |
| 2,280,226 | Firestone | Apr. 21, 1942 |
| 2,328,546 | Cafarelli | Sept. 7, 1943 |
| 2,669,121 | Garman et al. | Feb. 16, 1954 |